2,854,374
METHOD OF KILLING INSECTS USING CHLOROPHENYL-N,N-DIMETHYLCARBAMATES

Henderikus Obias Huisman and Jacques Meltzer, Weesp, Netherlands, assignors, by mesne assignments, to North American Philips Company, Inc., New York, N. Y., a corporation of Delaware No Drawing. Application June 3, 1954
Serial No. 434,347

Claims priority, application Netherlands June 9, 1953

4 Claims. (Cl. 167—30)

Applicants have found that carbamic acid derivatives of the chemical formula

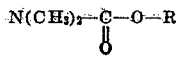

in which R is a phenyl group substituted with 1 to 3 chlorine atoms, generally have highly insecticidal properties and are not dangerous to men and domestic animals.

Said carbamic acid derivatives can be produced in many varying manners, for example by reacting mono- to tri-chlorinated phenol with dimethyl carbamic acid chloride in the presence of pyridine, in accordance with the reaction diagram

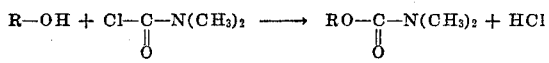

in which R again represents a phenyl group substituted with 1 to 3 chlorine atoms.

Among the compounds referred to 2,4,5-trichlorphenyl-N,N-dimethylcarbamate, which is particularly active with regard to flies and plant lice, and 2,5-dichlorphenyl-N,N-dimethylcarbamate, which is a strong fly poison, as well as parachlorphenyl-N,N-dimethylcarbamate have come to the fore.

In order to convey some idea of the method of producing such substances, such as usually employed, the production of 2,5-dichlorphenyl-N,N-dimethylcarbamate will hereinafter be described in detail.

1. Production of dimethyl carbamylchloride

This is carried out according to the reaction equation

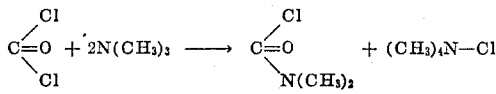

for example as follows: 1 litre of dry toluene is introduced into a three-necked round-bottomed flask having a capacity of 5 litres and furnished with a gas-inlet tube and a reflux cooler, to which a tube is connected which empties above a concentrated solution of caustic soda, and phosgene is introduced into the toluene, while cooling with ice, to an increase in weight of 550 g.

A concentrated solution of caustic soda is simultaneously added dropwise through a drop funnel into another three-necked round-bottomed flask, which also has a capacity of 5 litres and contains 955 g. trimethylamine hydrochloride. The escaping trimethyl amine is introduced through a washing flask containing concentrated caustic soda and through a drying tower containing solid soda into a flask containing 1 to 1½ litres of dry toluene and dissolved therein while cooling with ice. The trimethylamine may alternatively be introduced at a rate of 1 mol per hour, but in this case the initial rate should be a little lower.

The yield of trimethylamine, reckoned with regard to hydrochloride, is 95 to 98% of the theoretical yield.

The trimethyl amine solution is subsequently added dropwise to the phosgene solution whilst cooling with ice and stirring, the solution being after-stirred for 1 hour and the $(CH_3)_4$ N—Cl is sucked off. The toluene is distilled off at normal pressure and subsequently also, likewise at normal pressure, the dimethylcarbamyl chloride. The last-mentioned compound has a boiling point of 165 to 167° centigrade. Yield 60 to 70% by weight with regard to trimethyl amine.

2. Production of 2,5-dichlorophenyl-N,N-dimethyl carbamate

The dimethyl carbamyl chloride is subsequently reacted with 2,5-dichlorophenol according to the equation

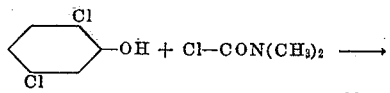

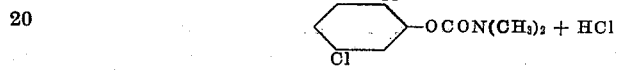

for example as follows: Equivalent quantities of 2,5-dichlorphenol, dimethyl carbamylchloride and dry pyridine (the last-mentioned material in slight excess) are introduced into a round-bottomed flask comprising a reflux cooler. The mixture is heated for two hours upon the steam bath, or, if desired, in an oil bath (to a temperature of approximately 150° centigrade). After cooling the reaction mixture, water and ether are added until all solid material has been dissolved. The layer of water is then separated from the layer of ether and extracted with ether, the extract being added to the ether layer. The ethereal layer is subsequently washed with 2 N sodium hydroxide to remove any non-converted phenol, and then washed with 2 N hydrochloric acid to remove the pyridine in excess, followed by rinsing with water to neutral reaction. The ethereal solution is dried by means of sodium sulphate and the ether is evaporated off. After cooling, the residue crystallizes to form a solid material which, after recrystallisation from petroleum ether, is obtained in the form of white crystals. The melting point is 53 to 54° centigrade, yield 64% of the theoretical yield reckoned with regard to dimethyl carbamyl chloride.

The following specification of a few tests made on flies and lice convey an idea of the insecticidal properties of compounds obtained in accordance with the invention.

(a) The cover of petri dishes with a bottom surface of approximately 100 cm.$^2$ is treated with a quantity of 0.001 mg. of p-chlorophenyl-N,N-dimethyl carbamate per sq. cm. All of the flies (*Musca domestica L.*) introduced into the dish died within 20 hours. After 4 hours 77% were dead.

(b) When treating the cover according to the same method as described under (a) with 0.01 mg. of 2,4-dichlorophenyl-N,N-dimethyl carbamate or 0.01 mg. of 2,5-dichlorophenyl-N,N-dimethyl carbamate per sq. cm., all flies in the dish died within 4 hours.

(c) When treating the cover according to the same method as described under (a) with 0.01 mg. of 2,4,5-trichlorphenyl-N,N-dimethyl carbamate per cm.$^2$ approximately 50% of the flies in the dish were dead after 4 hours and 100% were dead after 20 hours.

(d) When immersing bean plants (*Vicia faba L.*) in an emulsion containing 0.1 percent by weight of 2,4-dichlorophenyl-N,N-dimethyl carbamate or 0.1 percent by weight of 2,5-dichlorphenyl-N,N-dimethyl carbamate or 0.1 percent by weight of 2,4,5-trichlorphenyl-N,N-dimethyl carbamate, and infecting the plants, after drying, with the black bean louse (*Aphis fabae Scop.*), 90 to 100% of these lice died within 1 to 3 days.

What is claimed is:

1. The method of killing insects which comprises contacting the insects with a compound corresponding to the formula

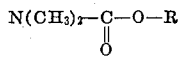

wherein R is a phenyl group substituted only with from 1 to 3 chlorine atoms.

2. The method of killing insects which comprises contacting the insects with a compound corresponding to the formula

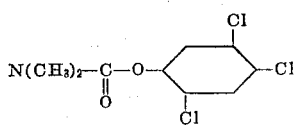

3. The method of killing insects which comprises contacting the insects with a compound corresponding to the formula

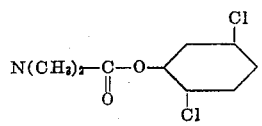

4. The method of killing insects which comprises contacting the insects with a compound corresponding to the formula

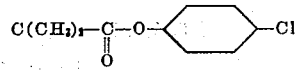

References Cited in the file of this patent

UNITED STATES PATENTS

| | | |
|---|---|---|
| 1,074,966 | Merling et al. | Oct. 7, 1913 |
| 2,493,710 | Aeschlimann et al. | Jan. 3, 1950 |
| 2,592,890 | Gysin | Apr. 15, 1952 |
| 2,677,698 | Deutschman et al. | May 4, 1954 |

FOREIGN PATENTS

| | | |
|---|---|---|
| 1,081,976 | France | June 16, 1954 |

OTHER REFERENCES

Gatterman: Fiebigo Ann. Chem. (1887), vol. 244, p. 43.

Oesper et al.: J. Am. Chem. Soc., vol. 47 (1925), pp. 2609–10.

Beilstein: vol. 6, 2nd suppl. (1944), p. 172.

Gardner et al.: J. Am. Chem. Soc., vol. 69 (1947), pp. 3086–8.